(12) United States Patent
Santhanam et al.

(10) Patent No.: US 10,791,558 B2
(45) Date of Patent: Sep. 29, 2020

(54) TECHNIQUES AND APPARATUSES FOR AUTONOMOUS RESOURCE SELECTION FOR VEHICLE-TO-EVERYTHING (V2X) TRANSMISSIONS

(71) Applicant: QUALCOMM Incorporated, San Diego, CA (US)

(72) Inventors: Arvind Santhanam, San Diego, CA (US); Scott Hoover, Del Mar, CA (US); Yunsong Mu, La Jolla, CA (US); Yuanbo Wang, San Diego, CA (US); Gang Xiao, San Diego, CA (US); Haiqin Liu, San Diego, CA (US); Subramanya Rao, Sunnyvale, CA (US); Taoufik Tani, San Diego, CA (US); Feng Lu, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 8 days.

(21) Appl. No.: 15/850,539

(22) Filed: Dec. 21, 2017

(65) Prior Publication Data

US 2019/0104525 A1    Apr. 4, 2019

Related U.S. Application Data

(60) Provisional application No. 62/567,045, filed on Oct. 2, 2017.

(51) Int. Cl.
*H04W 72/04* (2009.01)
*H04W 4/44* (2018.01)
(Continued)

(52) U.S. Cl.
CPC ....... *H04W 72/0486* (2013.01); *H04L 1/1825* (2013.01); *H04W 4/40* (2018.02);
(Continued)

(58) Field of Classification Search
CPC ......... H04W 72/0486; H04W 28/0252; H04W 72/02; H04W 72/048; H04W 4/44; H04L 1/0003; H04L 1/0009
See application file for complete search history.

(56) References Cited

U.S. PATENT DOCUMENTS 9,532,337 B2    12/2016 Nimbalker et al.
10,333,649 B1 *  6/2019 Oroskar ............... H04W 72/085
(Continued)

FOREIGN PATENT DOCUMENTS

WO    2016092528 A1    6/2016
WO    WO-2017039417 A1    3/2017
WO    WO-2017052690 A1    3/2017

OTHER PUBLICATIONS

Ericsson: "Congestion Control for Sidelink-based V2X," 3GPP Draft; R2-1700929—Congestion Control for Sidelink-based V2X, 3rd Generation Partnership Project (3GPP), Mobile Competence Centre; 650, Route Des Lucioles; F-06921 Sophia-Antipolis Cedex; FRA, vol. RAN WG2, No. Athens, Greece; Feb. 13, 2017-Feb. 17, 2017, Feb. 12, 2017, XP051211703, 10 pages, Retrieved from the Internet: URL: http://www.3gpp.org/ftp/Meetings_3GPP_SYNC/RAN2/Docs/ [retrieved on Feb. 12, 2017].
(Continued)

*Primary Examiner* — Un C Cho
*Assistant Examiner* — Yu-Wen Chang
(74) *Attorney, Agent, or Firm* — Harrity & Harrity, LLP

(57) ABSTRACT

Certain aspects of the present disclosure generally relate to wireless communication. In some aspects, a user equipment (UE) may determine a limit on a number of resource blocks (RBs) permitted to be used for a vehicle-to-everything (V2X) transmission by the UE; may determine, based at least in part on the limit, one or more parameters for the V2X transmission, wherein the one or more parameters include at least one of a modulation and coding scheme (MCS) for the
(Continued)

V2X transmission, a number of transport blocks (TBs) for the V2X transmission, a number of RBs per TB for the V2X transmission, or a retransmission configuration for the V2X transmission; and may transmit the V2X transmission based at least in part on the one or more parameters. Numerous other aspects are provided.

30 Claims, 6 Drawing Sheets

(51) Int. Cl.
| | |
|---|---|
| *H04W 72/02* | (2009.01) |
| *H04W 28/02* | (2009.01) |
| *H04W 4/40* | (2018.01) |
| *H04L 1/18* | (2006.01) |
| *H04L 1/00* | (2006.01) |
| *H04W 4/02* | (2018.01) |

(52) U.S. Cl.
CPC ......... *H04W 4/44* (2018.02); *H04W 28/0252* (2013.01); *H04W 72/02* (2013.01); *H04W 72/048* (2013.01); *H04L 1/0003* (2013.01); *H04L 1/0009* (2013.01); *H04W 4/02* (2013.01)

(56) References Cited

U.S. PATENT DOCUMENTS

| | | | | |
|---|---|---|---|---|
| 2007/0218847 A1* | 9/2007 | Cho | ...................... | H04L 1/0003 455/102 |
| 2012/0014347 A1* | 1/2012 | Tanaka | .................. | H04L 1/0007 370/329 |
| 2012/0058730 A1* | 3/2012 | Jitsukawa | ............. | H04L 1/0019 455/63.1 |
| 2014/0293811 A1* | 10/2014 | Rao | ..................... | H04W 52/262 370/252 |
| 2014/0308954 A1* | 10/2014 | Wang | .................. | H04W 36/165 455/436 |
| 2015/0085729 A1* | 3/2015 | Majjigi | ................. | H04W 52/12 370/311 |
| 2016/0007357 A1* | 1/2016 | Yang | ..................... | H04L 1/1812 370/329 |
| 2016/0295624 A1 | 10/2016 | Novlan et al. | | |
| 2017/0099624 A1 | 4/2017 | Baghel et al. | | |
| 2017/0142611 A1* | 5/2017 | Andgart | ................ | H04W 28/24 |
| 2017/0188391 A1* | 6/2017 | Rajagopal | ......... | H04W 74/0816 |
| 2017/0215170 A1 | 7/2017 | Islam et al. | | |
| 2018/0048994 A1* | 2/2018 | Kwon | ................... | H04W 76/11 |
| 2018/0234973 A1* | 8/2018 | Lee | ................... | H04W 72/0446 |
| 2018/0242190 A1* | 8/2018 | Khoryaev | ......... | H04W 28/0284 |
| 2018/0270707 A1* | 9/2018 | Seo | ........................ | H04L 1/1854 |
| 2018/0288685 A1* | 10/2018 | Jung | ..................... | H04W 48/16 |
| 2019/0150132 A1* | 5/2019 | Bala | ....................... | H04L 1/1893 |
| 2019/0373637 A1* | 12/2019 | Lee | ......................... | H04W 4/40 |

OTHER PUBLICATIONS

Intel Corporation: "Sidelink Congestion Control for V2X Services," 3GPP Draft; R1-1611925 Intel—V2V Congestion, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 14, 2016-Nov. 18, 2016, Nov. 13, 2016, XP051175891, 6 pages, Retrieved from the Internet: URL: http://www.3gpp.org/ftp/Meetings_3GPP_SYNC/RAN1/Docs/ [retrieved on Nov. 13, 2016].

International Search Report and Written Opinion—PCT/US2018/043924—ISA/EPO—dated Oct. 5, 2018.

LG Electronics: "Discussion on UE Behavior in Congestion Control," 3GPP Draft; R1-1611741, UE Behavior in Congestion Control V1, 3rd Generation Partnership Project (3GPP), Mobile Competence Centre; 650, Route Des Lucioles; F-06921 Sophia-Antipolis Cedex; France, vol. RAN WG1, No. Reno USA; Nov. 14. 2016-Nov. 18, 2016, Nov. 13, 2016, XP051175711, 4 Pages, Retrieved from the Internet: URL: http://www.3gpp.org/ftp/Meetings_3GPP_SYNC/RAN1/Docs/ [retrieved on Nov. 13, 2016].

Qualcomm Incorporated: "Congestion Control for V2V,"3GPP Draft; R2-168593_V2V_DCC, 3rd Generation Partnership Project (3GPP), Mobile Competence Centre; 650, Route Des Lucioles; F-06921 Sophia-Antipolis Cedex; France, vol. RAN WG2, No. Reno, USA; Nov. 14, 2016-Nov. 18, 2016, Nov. 13, 2016, XP051178163, 14 pages, Retrieved from the Internet: URL: http://www.3gpp.org/ftp/Meetings_3GPP_SYNC/RAN2/Docs/ [retrieved on Nov. 13, 2016].

* cited by examiner

TECHNIQUES AND APPARATUSES FOR AUTONOMOUS RESOURCE SELECTION FOR VEHICLE-TO-EVERYTHING (V2X) TRANSMISSIONS

CROSS-REFERENCE TO RELATED APPLICATIONS UNDER 35 U.S.C. § 119

This application claims priority to Provisional Patent Application No. 62/567,045, filed on Oct. 2, 2017, entitled "TECHNIQUES AND APPARATUSES FOR AUTONOMOUS RESOURCE SELECTION FOR VEHICLE-TO-EVERYTHING (V2X) TRANSMISSIONS," which is hereby expressly incorporated by reference herein.

TECHNICAL FIELD

Aspects of the present disclosure generally relate to wireless communication, and more particularly to techniques and apparatuses for autonomous resource selection for V2X transmissions.

INTRODUCTION

Wireless communication systems are widely deployed to provide various telecommunication services, such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE) systems. LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via a downlink and an uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include determining a limit on a number of resource blocks (RBs) permitted to be used for a vehicle-to-everything (V2X) transmission by the UE; determining, based at least in part on the limit, one or more parameters for the V2X transmission, wherein the one or more parameters include at least one of a modulation and coding scheme (MCS) for the V2X transmission, a number of transport blocks (TBs) for the V2X transmission, a number of RBs per TB for the V2X transmission, or a retransmission configuration for the V2X transmission; and transmitting the V2X transmission based at least in part on the one or more parameters.

In some aspects, a UE for wireless communication may include memory and one or more processors operatively coupled to the memory. The memory and the one or more processors may be configured to determine a limit on a number of resource blocks (RBs) permitted to be used for a vehicle-to-everything (V2X) transmission by the UE; determine, based at least in part on the limit, one or more parameters for the V2X transmission, wherein the one or more parameters include at least one of a modulation and coding scheme (MCS) for the V2X transmission, a number of transport blocks (TBs) for the V2X transmission, a number of RBs per TB for the V2X transmission, or a retransmission configuration for the V2X transmission; and transmit the V2X transmission based at least in part on the one or more parameters.

In some aspects, a non-transitory computer-readable medium may store one or more instructions for wireless communication. The one or more instructions, when executed by one or more processors of a UE, may cause the one or more processors to determine a limit on a number of resource blocks (RBs) permitted to be used for a vehicle-to-everything (V2X) transmission by the UE; determine, based at least in part on the limit, one or more parameters for the V2X transmission, wherein the one or more parameters include at least one of a modulation and coding scheme (MCS) for the V2X transmission, a number of transport blocks (TBs) for the V2X transmission, a number of RBs per TB for the V2X transmission, or a retransmission configuration for the V2X transmission; and transmit the V2X transmission based at least in part on the one or more parameters.

In some aspects, an apparatus for wireless communication may include means for determining a limit on a number of resource blocks (RBs) permitted to be used for a vehicle-to-everything (V2X) transmission by the apparatus; means for determining, based at least in part on the limit, one or more parameters for the V2X transmission, wherein the one or more parameters include at least one of a modulation and coding scheme (MCS) for the V2X transmission, a number of transport blocks (TBs) for the V2X transmission, a number of RBs per TB for the V2X transmission, or a retransmission configuration for the V2X transmission; and means for transmitting the V2X transmission based at least in part on the one or more parameters.

Aspects generally include a method, apparatus, system, computer program product, non-transitory computer-readable medium, user equipment, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
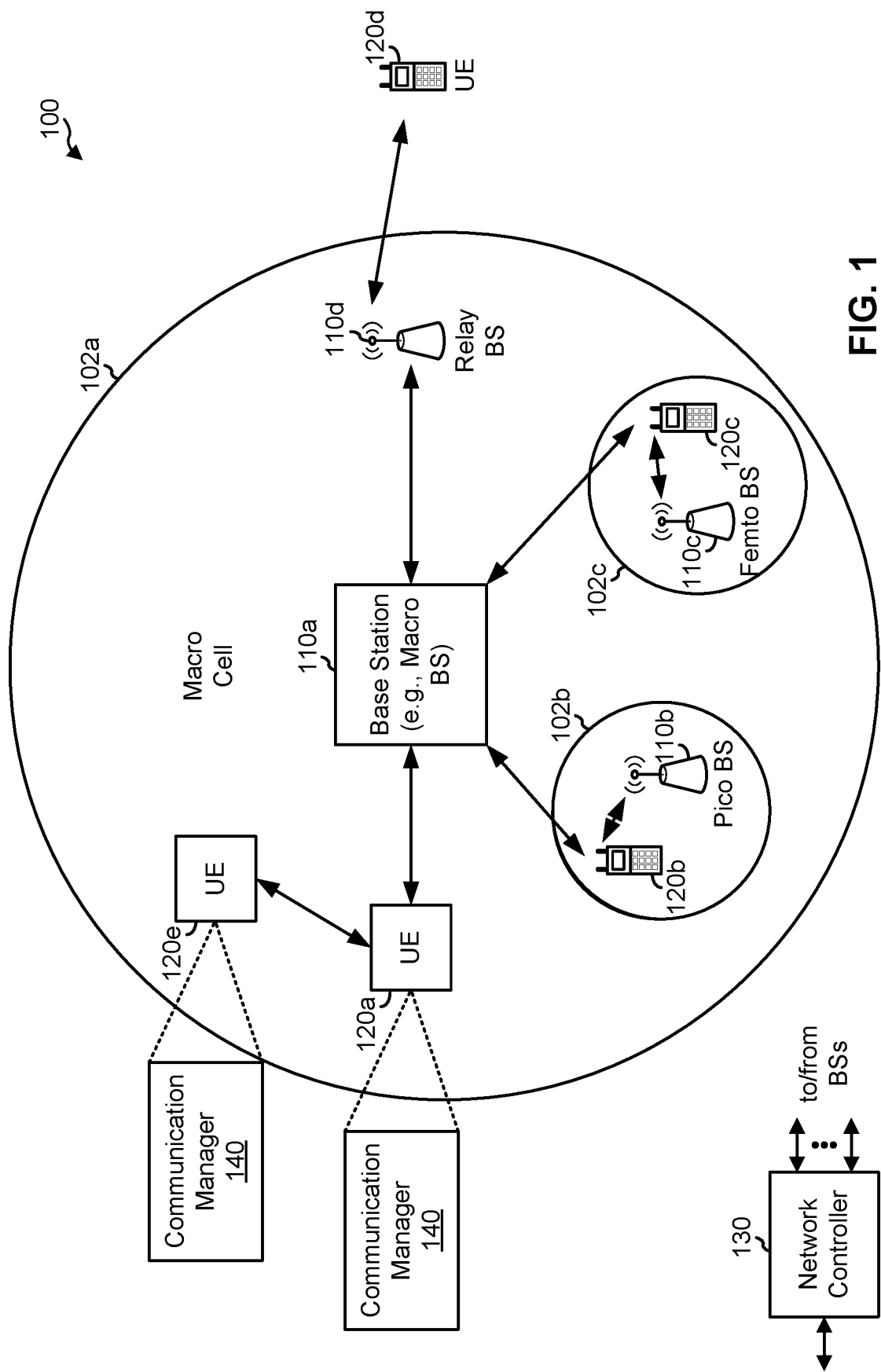
FIG. 1 is a block diagram conceptually illustrating an example of a wireless communication network, in accordance with certain aspects of the present disclosure.

In a vehicle-to-everything (V2X) wireless communication system, UEs may communicate directly using device-to-device communication, also known as sidelink communication, without using a base station as an intermediary. In some cases, a UE may operate using transmission mode 4, where resource selection and/or scheduling is performed by the UE rather than a base station. In some aspects, the UE may perform resource selection and/or scheduling by measuring one or more sidelink channels, by decoding sidelink control information (SCI) that indicates channel availability, by determining a channel busy rate (CBR) associated with various sidelink channels, and/or the like.

In transmission mode 4, a UE may generate sidelink grants, and may transmit the sidelink grants in SCI. A sidelink grant may indicate, for example, one or more parameters (e.g., transmission parameters) to be used for an upcoming V2X transmission (e.g., a V2X data transmission), such as one or more resource blocks to be used for the upcoming V2X transmission, one or more subframes to be used for the upcoming V2X transmission, a modulation and coding scheme (MCS) to be used for the upcoming V2X transmission, and/or the like.

In V2X communication systems, conditions of the sidelink channel used to carry V2X communications can vary widely and change quickly due to the high mobility of vehicles and UEs associated with the vehicles, large variations in vehicle traffic at different times of day and in different locations, a wide variety of topographies that the vehicles may traverse (e.g., dense urban environments, hilly environments, flat environments, etc.), and/or the like. Furthermore, V2X communication systems need to be highly reliable due to mission critical safety issues associated with, for example, autonomous vehicles. Some techniques and apparatuses described herein improve performance of V2X communication systems by dynamically determining parameters for V2X transmissions based at least in part on dynamic factors associated with one or more vehicles, the sidelink channel, and/or the like.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a network 100 in which aspects of the present disclosure may be practiced. The network 100 may be an LTE network, a 5G or NR network, and/or the like. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using a vehicle-to-everything (V2X) protocol, which may include a vehicle-to-vehicle (V2V) protocol, a vehicle-to-infrastructure (V2I) protocol, and/or the like. In this case, the UE 120 may perform scheduling operations, resource selection operations, and/or other operations described elsewhere herein as being performed by the base station 110. In some aspects, a UE 120 may operate in transmission mode 3, where resource selection and/or scheduling is performed by the base station 110. In some aspects, a UE 120 may operate in transmission mode 4, where resource selection and/or scheduling is performed by the UE 120. Additional details regarding sidelink communications and V2X communications are described below in connection with FIG. 3.

As shown in FIG. 1, the UE 120 may include a communication manager 140. As described in more detail elsewhere herein, the communication manager 140 may determine a limit on a number of resource blocks (RBs) permitted to be used for a V2X transmission by the UE 120, may determine one or more parameters for the V2X transmission based at least in part on the limit, may transmit the V2X transmission based at least in part on the one or more parameters, and/or the like. Additionally, or alternatively, the communication manager 140 may perform one or more other operations described herein.

As indicated above, FIG. 1 is provided merely as an example. Other examples are possible and may differ from what was described with regard to FIG. 1.

Figure 2:
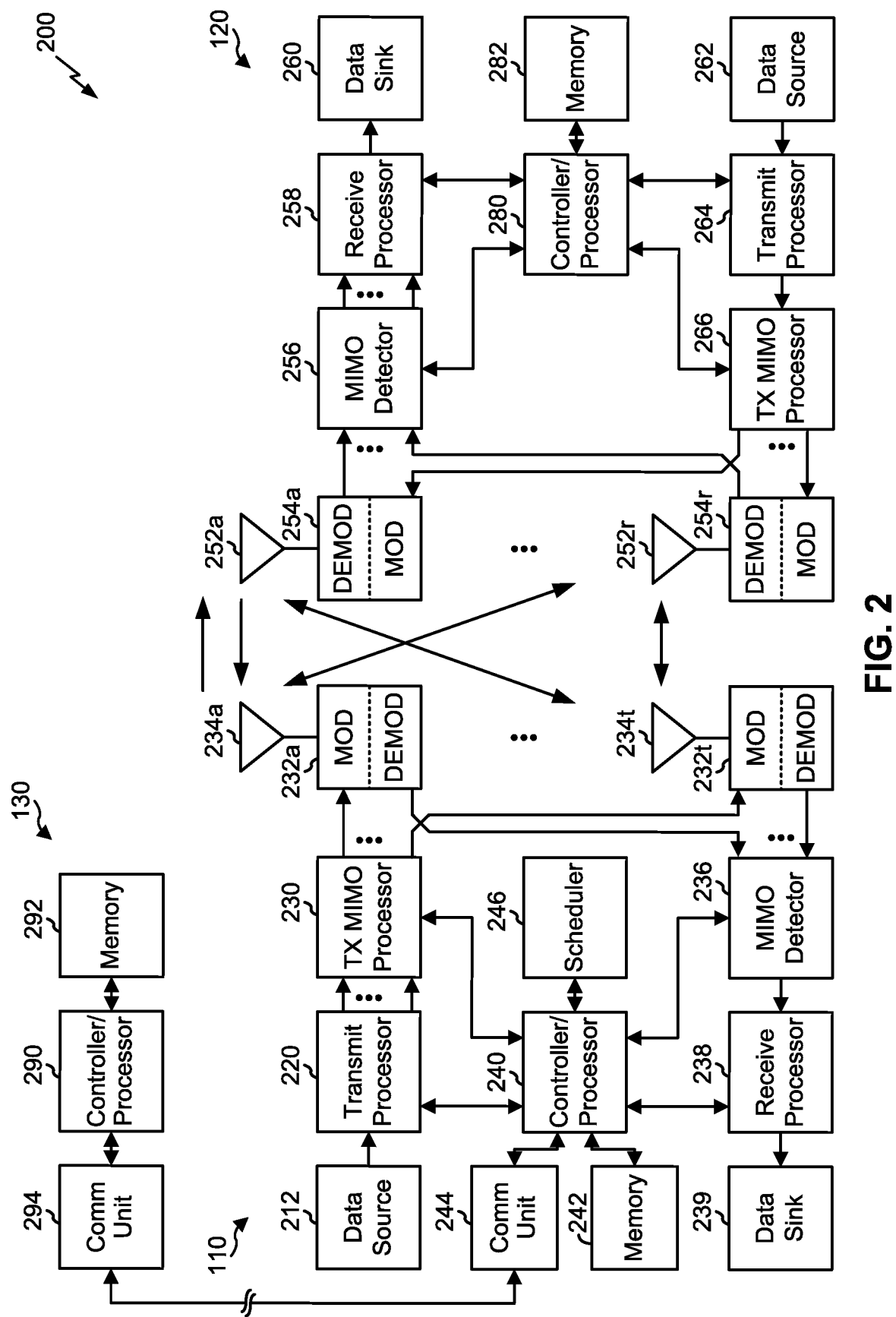
FIG. 2 is a block diagram conceptually illustrating an example of a base station in communication with a user equipment (UE) in a wireless communication network, in accordance with certain aspects of the present disclosure.

FIG. 2 shows a block diagram of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to certain aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Although FIG. 2 illustrates components of a base station 110, a UE 120, and a network controller 130 for completeness, in some aspects, two or more UEs 120 may communicate directly with one another via a sidelink (e.g., without communicating with a base station 110 as an intermediary). In this case, one or more components of the UE 120 may perform one or more operations or functions described herein as being performed by one or more components of the base station 110 (e.g., for scheduling, resource selection, and/or the like). Additional details regarding direct UE-to-UE communications are described below in connection with FIG. 3.

In some aspects, one or more components of UE 120 may be included in a housing. Controller/processor 280 of UE 120 and/or any other component(s) of FIG. 2 may perform one or more techniques associated with autonomous resource selection for V2X transmissions, as described in more detail elsewhere herein. For example, controller/processor 280 of UE 120 and/or any other component(s) of FIG. 2 may perform or direct operations of, for example, process 600 of FIG. 6 and/or other processes as described herein. Memories 242 and 282 may store data and program codes for base station 110 and UE 120, respectively. A scheduler 246 may schedule UEs for data transmission on the downlink and/or uplink.

In some aspects, the UE 120 may include means for determining a limit on a number of resource blocks (RBs) permitted to be used for a V2X transmission by the UE 120, means for determining one or more parameters for the V2X transmission based at least in part on the limit, means for transmitting the V2X transmission based at least in part on the one or more parameters, and/or the like. Additionally, or alternatively, the UE 120 may include means for performing one or more other operations described herein. In some aspects, such means may include the communication manager 140. Additionally, or alternatively, such means may include one or more components of the UE 120 described in connection with FIG. 2.

As indicated above, FIG. 2 is provided merely as an example. Other examples are possible and may differ from what was described with regard to FIG. 2.

Figure 3:
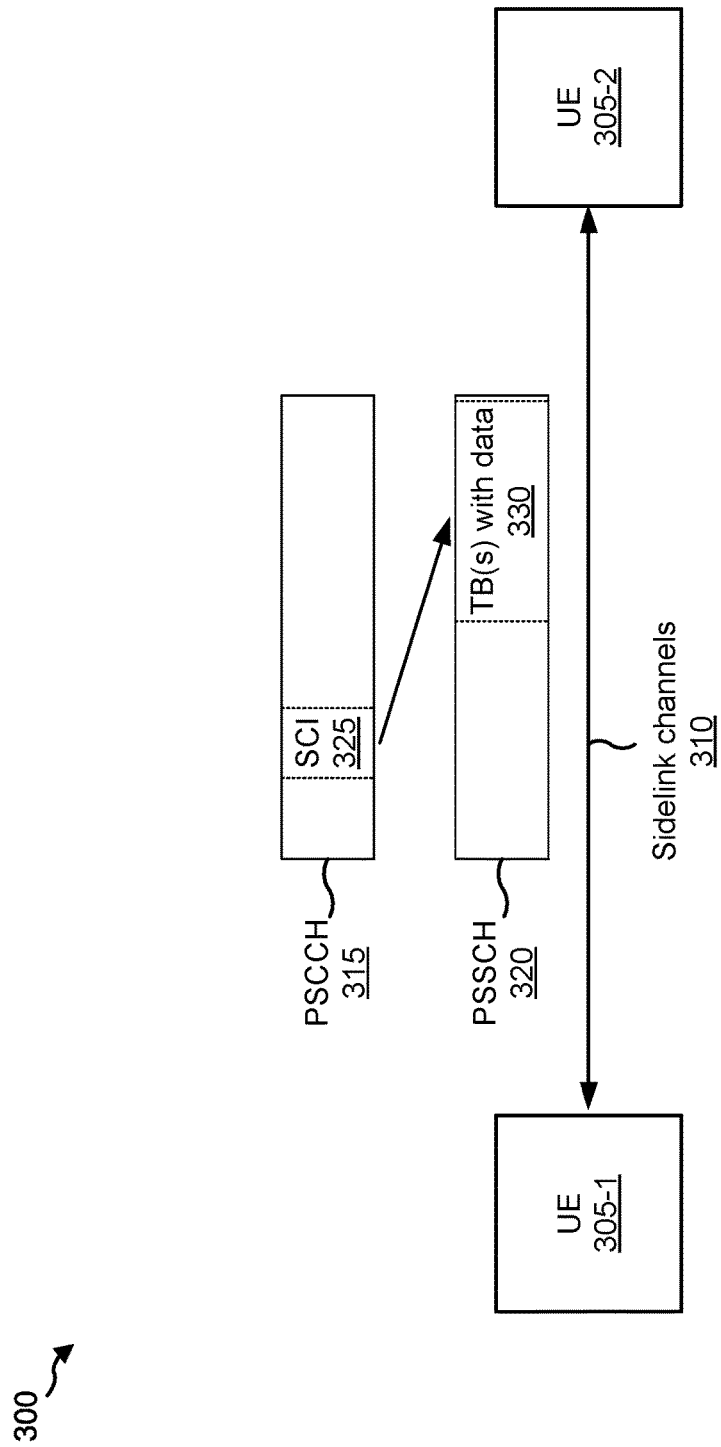
FIG. 3 is a block diagram conceptually illustrating an example of V2X communications via a sidelink, in accordance with certain aspects of the present disclosure.

FIG. 3 is a block diagram conceptually illustrating an example 300 of V2X communications via a sidelink, in accordance with certain aspects of the present disclosure.

As shown in FIG. 3, a first UE 305-1 may communicate with a second UE 305-2 (and one or more other UEs 305) using device-to-device (D2D) communications via one or more sidelink channels 310. In some aspects, the UEs 305 may correspond to one or more other UEs described elsewhere herein, such as UE 120 and/or the like. In some aspects, the sidelink channel 310 may use a PC5 interface and/or may operate in a high frequency band (e.g., the 5.9 GHz band). Additionally, or alternatively, the UEs 305 may synchronize timing of transmission time intervals (e.g., frames, subframes, slots, and/or the like) using global navigation satellite system (GNSS) timing. The UEs 305 may transmit V2X communications using the sidelink channel 310.

In some aspects, V2X transmissions may be one-to-many broadcast and/or multicast transmissions. In some aspects, V2X transmissions may not require any physical layer feedback from receiving devices, such as acknowledgement (ACK) or negative acknowledgement (NACK) feedback. In some aspects, V2X transmissions may be configured without retransmission. In some aspects, V2X transmissions may be configured with a small number of retransmissions (e.g., one retransmission) that always occur (e.g., without ACK/NACK feedback).

As further shown in FIG. 3, the sidelink channel 310 may include a physical sidelink control channel (PSCCH) 315 and a physical sidelink shared channel (PSSCH) 320. The PSCCH 315 may be used to communicate control information, similar to a physical downlink control channel (PDCCH) and/or a physical uplink control channel (PUCCH) used for communications with a base station 110. The PSSCH 320 may be used to communicate data, similar to a physical downlink shared channel (PDSCH) and/or a physical uplink shared channel (PUSCH) used for communications with a base station 110. For example, the PSCCH 315 may carry sidelink control information (SCI) 325, which may indicate various control information used for sidelink communications, such as one or more resources (e.g., time and/or frequency resources) where a transport block (TB) 330 that includes data is carried on the PSSCH 320. The TB 330 may include V2X data, such as a basic safety message (BSM), a traffic information message (TIM), a signal phase and time (SPAT) message, a MAP message to convey geographic road information, a cooperative awareness message (CAM), a distributed environment notification message (DENM), an in-vehicle information (IVI) message, and/or the like.

In some aspects, the sidelink channel 310 may use resource pools. For example, a scheduling assignment (e.g., included in SCI 325) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using transmission mode 4, where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, may measure a reference signal received quality (RSRQ) parameter (e.g., a PSSCH-RSRQ parameter) associated with various sidelink channels, and/or the like, and may select a channel for transmission of V2X communications based at least in part on the measurement(s).

Additionally, or alternatively, the UE 305 may perform resource selection and/or scheduling using SCI 325 received in the PSCCH 315, which may indicate occupied resources, channel parameters, and/or the like. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In transmission mode 4, a UE 305 may generate sidelink grants, and may transmit the grants in SCI 325. A sidelink grant may indicate, for example, one or more parameters (e.g., transmission parameters) to be used for an upcoming V2X transmission, such as one or more resource blocks to be used for the upcoming V2X transmission on the PSSCH 320 (e.g., for TBs 330), one or more subframes to be used for the upcoming V2X transmission, a modulation and coding scheme (MCS) to be used for the upcoming V2X transmission, and/or the like. In some aspects, a UE 305 may generate a sidelink grant that indicates one or more parameters for semi-persistent scheduling (SPS), such as a periodicity of a V2X transmission (e.g., a periodic V2X message, such as a safety message and/or the like). Additionally, or alternatively, the UE 305 may generate a sidelink grant for event-driven scheduling, such as for an on-demand V2X message.

In V2X communication systems, conditions of the sidelink channel 310 used to carry V2X communications can vary widely and change quickly due to the high mobility of vehicles and UEs associated with the vehicles, large variations in vehicle traffic at different times of day and in different locations, a wide variety of topographies that the vehicles may traverse (e.g., dense urban environments, hilly environments, flat environments, etc.), and/or the like. Furthermore, V2X communication systems need to be highly reliable due to mission critical safety issues associated with, for example, autonomous vehicles. Some techniques and apparatuses described herein improve performance of V2X communication systems by dynamically determining parameters for V2X transmissions based at least in part on dynamic factors associated with one or more vehicles, the sidelink channel 310, and/or the like.

As indicated above, FIG. 3 is provided merely as an example. Other examples are possible and may differ from what was described with regard to FIG. 3.

Figure 4:
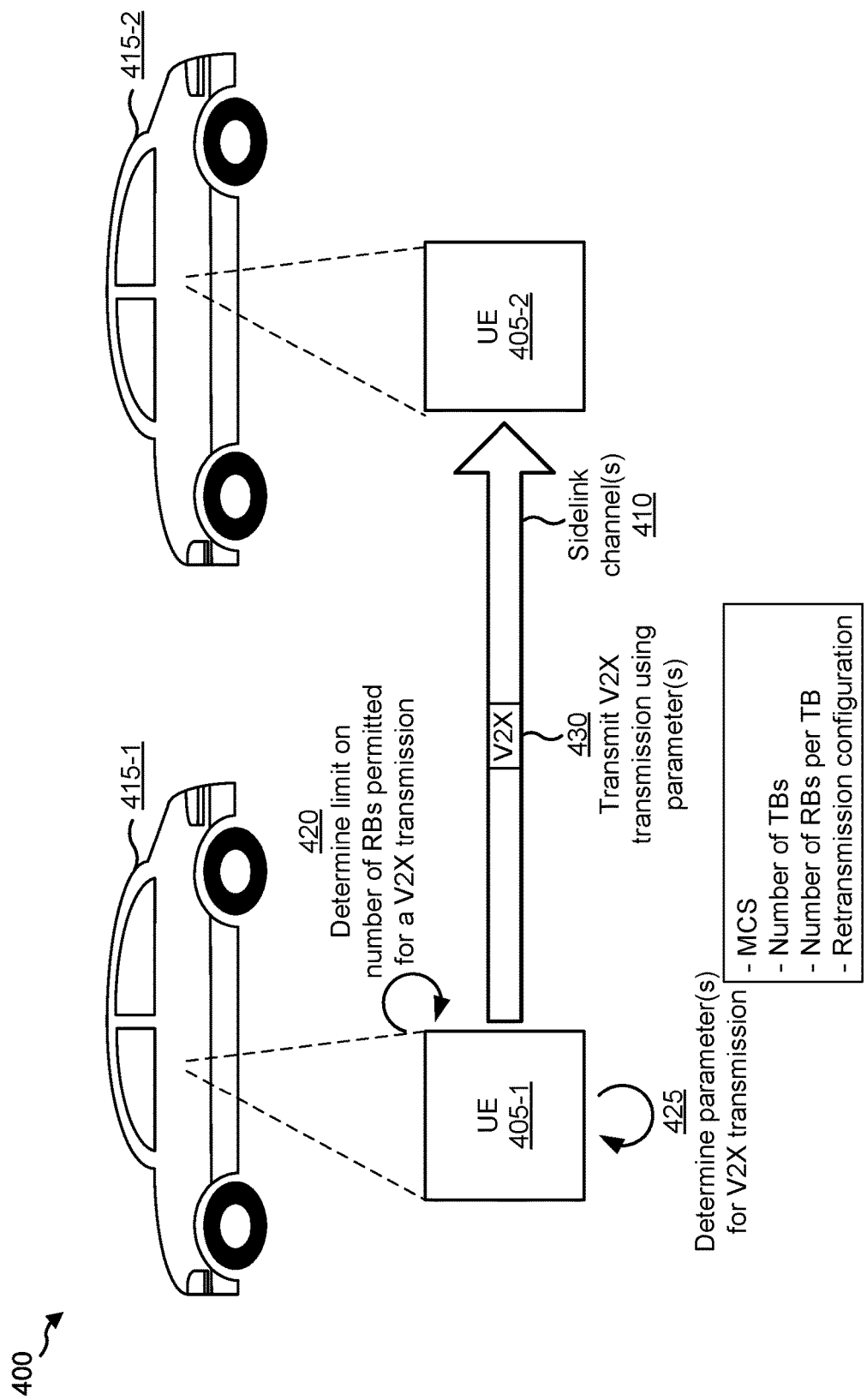
FIGS. 4 and 5 are diagrams illustrating examples of autonomous resource selection for V2X transmissions, in accordance with various aspects of the present disclosure.

FIG. 4 is a diagram illustrating an example 400 of autonomous resource selection for V2X transmissions, in accordance with various aspects of the present disclosure.

As shown in FIG. 4, a first UE 405-1 may communicate with a second UE 405-2 (and one or more other UEs 405) via one or more sidelink channels 410. In some aspects, the UEs 405 may correspond to one or more other UEs described elsewhere herein, such as UE 120, UE 305, and/or the like. In some aspects, the sidelink channel 410 may correspond to one or more sidelink channels described elsewhere herein, such as sidelink channel 310 and/or the like. In some aspects, a UE 405 may be associated with a vehicle 415 (e.g., may be integrated into the vehicle 415, may be located in or on the vehicle 415, and/or the like). The vehicle 415 may include an autonomous vehicle, a semi-autonomous vehicle, a non-autonomous vehicle, and/or the like. Although both UEs 405 in FIG. 4 are shown as being associated with a vehicle 415, in some aspects, one or more of the UEs 405 may not be associated with a vehicle 415. For example, a UE 405 may be associated with infrastructure (e.g., traffic infrastructure), such as a traffic signal, a lane signal, a sensor, a traffic controller system, and/or the like.

As shown by reference number 420, the first UE 405-1 may determine a limit on a number of resource blocks (RBs) permitted to be used for a V2X transmission by the first UE 405-1. In some aspects, the first UE 405-1 may determine the limit based at least in part on a congestion level of one or more sidelink channels, which may be determined based at least in part on measuring one or more sidelink channels (e.g., for S-RSSI, PSSCH-RSRP, and/or the like), receiving SCI associated with the one or more sidelink channels, and/or the like. For example, the first UE 405-1 may determine a channel busy rate (CBR) for a sidelink channel in association with a time n at which resource selection is triggered for the first UE 405-1 (e.g., CBR(n-100, n-1), where n-100 denotes a start of a time period and n-1 denotes the end of the time period), and may determine a maximum number of RBs allowed for use by the first UE 405-1 at time n based at least in part on the CBR. Additionally, or alternatively, the first UE 405-1 may determine the limit on the number of RBs by determining a maximum number of RBs allowed for use by the first UE 405-1 in association with time n (e.g., $CR_{limit}(n)$) and subtracting a number of RBs already used or scheduled by the first UE 405-1 in association with time n (e.g., CR(n-a, n+b), where n-a denotes a start of the time period and n+b denotes an end of the time period).

As shown by reference number 425, the first UE 405-1 may determine one or more parameters for the V2X transmission based at least in part on the limit on the number of RBs. In some aspects, the one or more parameters may be referred to as one or more transmission parameters and/or one or more V2X transmission parameters. As shown, the one or more parameters may include a modulation and coding scheme (MCS) for the V2X transmission, a number of transport blocks (TBs) for the V2X transmission, a number of RBs per TB for the V2X transmission, a retransmission configuration for the V2X transmission, and/or the like. In some aspects, the first UE 405-1 may determine the one or more parameters such that the number of RBs for the V2X transmission does not exceed the limit on the number of RBs.

As an example, if the first UE 405-1 selects an MCS with a lower index value (e.g., permitting fewer bits per symbol) for a V2X transmission, then that V2X transmission would require more TBs and corresponding RBs than if the same V2X transmission were to use an MCS with a higher index value (e.g., permitting more bits per symbol). However, using an MCS with a lower index value for the V2X transmission may increase the range of the V2X transmission and/or may increase reliability of the V2X transmission as compared to using an MCS with a higher index value. Thus, in some aspects, if the limit on the number of RBs is relatively high (e.g., greater than or equal to a threshold), then the first UE 405-1 may select an MCS with a lower index value, and if the limit on the number of RBs is relatively low (e.g., less than or equal to a threshold), then the first UE 405-1 may select an MCS with a higher index value. In some aspects, the first UE 405-1 may select from multiple different MCS index values, and different MCS index values may be associated with different thresholds for the limit on the number of RBs.

As another example, if the first UE 405-1 configures a retransmission configuration to enable retransmissions for a V2X transmission, then that V2X transmission would require more TBs and corresponding RBs than if the first UE 405-1 were to configure the retransmission configuration to disable retransmissions for the same V2X transmission. However, enabling retransmissions for the V2X transmission may increase the range of the V2X transmission and/or may increase reliability of the V2X transmission as compared to disabling retransmissions for the V2X transmission. Thus, in some aspects, if the limit on the number of RBs is relatively high (e.g., greater than or equal to a threshold), then the first UE 405-1 may enable retransmissions, and if the limit on the number of RBs is relatively low (e.g., less than or equal to a threshold), then the first UE 405-1 may disable retransmissions. In some aspects, the first UE 405-1 may select from multiple different quantities of retransmissions (e.g., one retransmission, two retransmissions, etc.), and different quantities of retransmissions may be associated with different thresholds for the limit on the number of RBs.

In some aspects, the first UE 405-1 may select the one or more parameters to increase or maximize a range for the V2X transmission (e.g., a distance that can be covered by the V2X transmission and corresponding retransmissions) subject to the limit on the number of RBs, as described in more detail below in connection with FIG. 5. In this way, the first UE 405-1 may improve reliability, may increase safety, may increase the likelihood of successful reception of the V2X transmission, etc., while operating according to the limit on the number of RBs permitted for the V2X transmission.

In a V2X communication system, sidelink channel conditions can vary widely at different times, at different geographic locations, on different frequencies, and/or the like. Thus, the first UE 405-1 may dynamically determine the one or more parameters for the V2X transmission based at least in part on conditions that exist at the time that the V2X transmission is scheduled. In some aspects, the first UE 405-1 may determine the one or more transmission parameters based at least in part on a dynamic factor associated with the first UE 405-1 and/or a vehicle associated with the first UE 405-1 (e.g., a network traffic demand associated with one or more applications of the first UE 405-1, a speed or velocity of the first UE 405-1, a location of the first UE 405-1, a topography of the location, and/or the like). Additionally, or alternatively, the first UE 405-1 may determine the one or more transmission parameters based at least in part on a dynamic factor associated with a wireless network via which the V2X transmission is to be transmitted (e.g., a congestion level associated with the wireless network, a carrier frequency on which the V2X transmission is to be transmitted, a priority of the V2X transmission on the wireless network, and/or the like). In this way, the first UE 405-1 may improve or optimize transmission of V2X messages under changing conditions.

In some aspects, the first UE 405-1 may be capable of selecting one or more frequencies to carry the V2X transmission, and may determine the one or more parameters based at least in part on the selected frequency or frequencies. For example, a range of the V2X transmission may depend on a frequency used to transmit the V2X transmission (e.g., a lower frequency may have a higher range and a higher frequency may have a lower range). In some aspects, the first UE 405-1 may select a frequency for the V2X transmission based at least in part on an estimated range associated with the frequency (e.g., by prioritizing a lower frequency over a higher frequency).

Additionally, or alternatively, the first UE 405-1 may determine the one or more V2X transmission parameters based at least in part on the selected frequency or frequencies. For example, different frequencies may be associated with different CBR values, and thus may be associated with different limits on the number of RBs permitted for use by the first UE 405-1. Additionally, or alternatively, different combinations of transmission parameters may result in different performance at different frequencies, and the first UE 405-1 may use this as a factor when determining the one or more transmission parameters.

In some aspects, the first UE 405-1 may determine the one or more transmission parameters based at least in part on a network traffic demand associated with one or more applications of the first UE 405-1. For example, if the first UE 405-1 has a relatively high network traffic demand (e.g., the number of requested V2X transmissions is greater than or equal to a threshold), then the first UE 405-1 may use a smaller number of RBs per V2X transmission. Conversely, if the first UE 405-1 has a relatively low network traffic demand (e.g., the number of requested V2X transmissions is less than or equal to a threshold), then the first UE 405-1 may use a larger number of RBs per V2X transmission. The first UE 405-1 may configure a smaller number of RBs per V2X transmission by using a higher MCS index, by disabling retransmissions or configuring a smaller number of retransmissions, by using a smaller number of TBs, and/or by using a smaller number of RBs per TB. Conversely, the first UE 405-1 may configure a larger number of RBs per V2X transmission by using a lower MCS index, by enabling retransmissions or configuring a larger number of retransmissions, by using a larger number of TBs, and/or by using a larger number of RBs per TB.

Additionally, or alternatively, the first UE 405-1 may determine the one or more transmission parameters based at least in part on a congestion level associated with a wireless network via which the V2X transmission is to be transmitted (e.g., a congestion level of the sidelink channel 410 and/or one or more frequencies via which the V2X transmission is to be transmitted). For example, if the wireless network has a relatively high congestion level, then the first UE 405-1 may use a smaller number of RBs per V2X transmission. Conversely, if the wireless network has a relatively low congestion level, then the first UE 405-1 may use a larger number of RBs per V2X transmission. In some aspects, the first UE 405-1 may determine the congestion level based at least in part on a CBR, a resource restriction (e.g., a rate control parameter, a power control parameter, a congestion control parameter, etc.), a measured parameter of the wireless network (e.g., an energy level), and/or the like.

Additionally, or alternatively, the first UE 405-1 may determine the one or more parameters based at least in part on a priority of the V2X transmission. For example, the first UE 405-1 may select one or more parameters that result in a higher transmission range for a high priority packet, and may select one or more parameters that result in a lower transmission range for a low priority packet.

Additionally, or alternatively, the first UE 405-1 may determine the one or more parameters based at least in part on a velocity of the first UE 405-1 (e.g., a velocity at the time of scheduling the V2X transmission), which may correspond to a velocity of a vehicle 415 associated with the first UE 405-1. In some aspects, demodulation may be challenging at high speeds due to Doppler shift. Thus, the first UE 405-1 may select a lower MCS index for V2X transmission when the first UE 405-1 is traveling at a high velocity (e.g., greater than or equal to a threshold velocity). Conversely, the first UE 405-1 may select a higher MCS index for V2X transmission when the first UE 405-1 is traveling at a low velocity (e.g., less than or equal to a threshold velocity). In some aspects, the first UE 405-1 may select from multiple different MCS index values, and different MCS index values may be associated with different thresholds for the velocity of the first UE 405-1.

Additionally, or alternatively, the first UE 405-1 may determine the one or more parameters based at least in part on a topography associated with a location of the first UE 405-1. For example, different combinations of parameters may result in different performance in different topographies, and the first UE 405-1 may select a combination of parameters that provides better performance (e.g., increased range) as compared to another combination of parameters. In some aspects, the first UE 405-1 and/or a vehicle associated with the first UE 405-1 may detect the topography (e.g., using LIDAR and/or the like).

Additionally, or alternatively, the first UE 405-1 may determine the one or more parameters based at least in part a location of the first UE 405-1. In some aspects, performance of different combinations of parameters may be measured over time (e.g., by one or more UEs 405) in different locations, and/or may be indicated to one or more UEs 405. In some aspects, the UE 405 may store information indicating one or more parameters to be used in a location based at least in part on historical performance of those parameters in that location.

Additionally, or alternatively, the first UE 405-1 may determine the one or more parameters based at least in part on a number of bits of the V2X transmission (e.g., which impacts a number of RBs needed for the V2X transmission), a deadline for transmission of the V2X transmission (e.g., which may impact a determination of whether to wait for improved channel conditions and transmit with a larger range, whether to transmit sooner with shorter range, and/or the like), a semi-persistent scheduling period associated with the V2X transmission (e.g., which may be used to determine RBs for periodic V2X transmissions), and/or the like.

As shown by reference number 430, the first UE 405-1 may transmit the V2X transmission (e.g., to the second UE 405-2 and/or one or more other UEs 405) based at least in part on the one or more parameters. For example, the first UE 405-1 may modulate and/or encode the V2X transmission using a selected MCS, may transmit the V2X transmission using a selected number of TBs, may transmit the V2X transmission using a selected number of RBs per TB, may retransmit or prevent retransmission of the V2X transmission according to a selected retransmission configuration, may transmit the V2X transmission on a selected carrier frequency, and/or the like. By accounting for dynamic factors when determining the above transmission parameter(s), the first UE 405-1 may improve performance (e.g., a transmission range) of the V2X transmission subject to constraints on the V2X transmission. For example, in some cases, the first UE 405-1 may transmit a V2X transmission using an MCS with a high index, rather than dropping the V2X transmission.

As indicated above, FIG. 4 is provided merely as an example. Other examples are possible and may differ from what was described with regard to FIG. 4.

Figure 5:
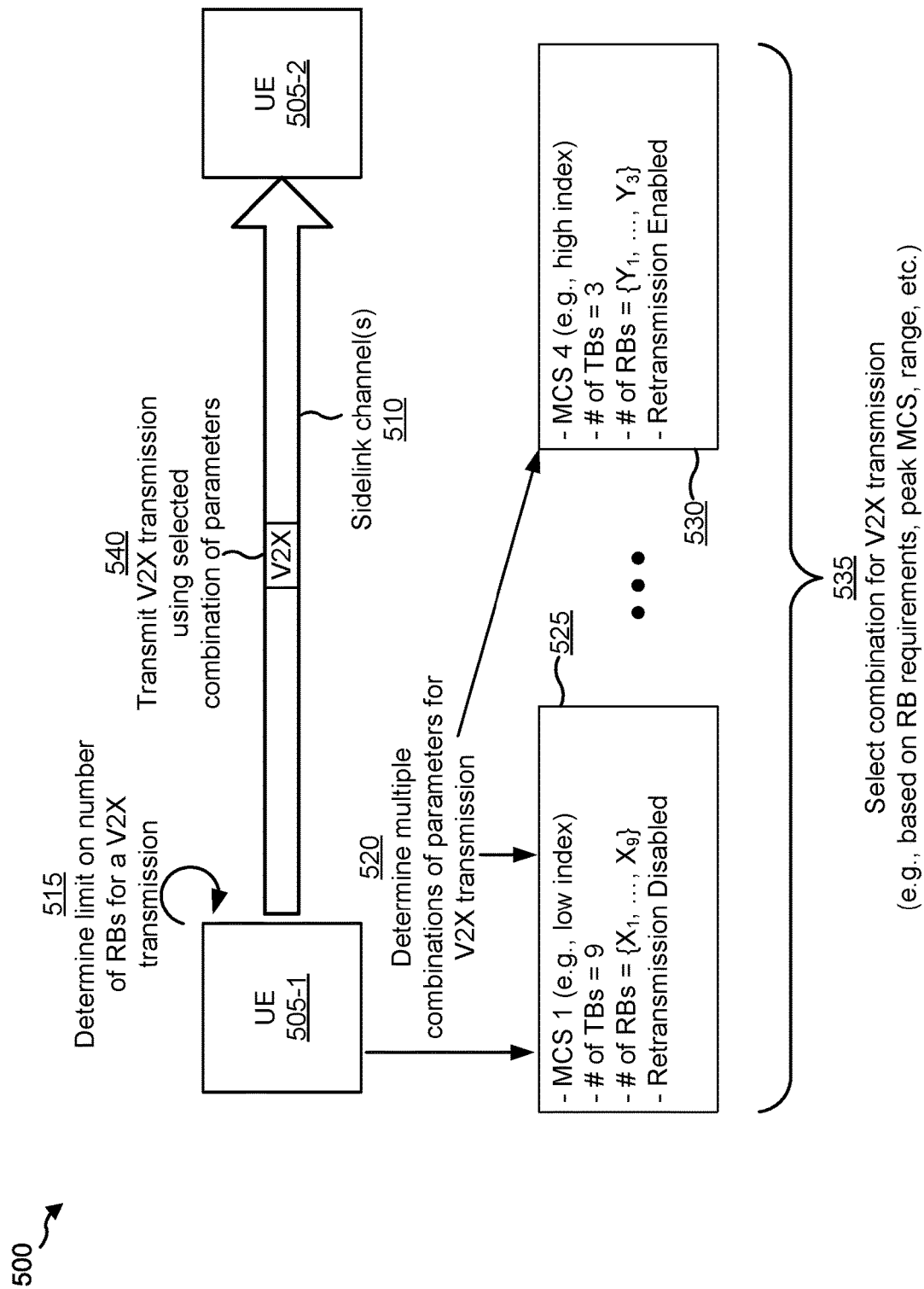

FIG. 5 is a diagram illustrating an example 500 of autonomous resource selection for V2X transmissions, in accordance with various aspects of the present disclosure.

As shown in FIG. 5, a first UE 505-1 may communicate with a second UE 505-2 (and one or more other UEs 505) via one or more sidelink channels 510. In some aspects, the UEs 505 may correspond to one or more other UEs described elsewhere herein, such as UE 120, UE 305, UE 405, and/or the like. In some aspects, the sidelink channel 510 may correspond to one or more sidelink channels described elsewhere herein, such as sidelink channel 310, sidelink channel 410, and/or the like. In some aspects, a UE 505 may be associated with a vehicle and/or infrastructure, as described above in connection with FIG. 4.

As shown by reference number 515, the first UE 505-1 may determine a limit on a number of RBs permitted to be used for a V2X transmission by the first UE 505-1, as described above in connection with FIG. 4.

As shown by reference number 520, the first UE 505-1 may determine multiple combinations of parameters to potentially be used for the V2X transmission. Two different combinations may include at least one parameter that is different between the two different combinations, such as a different MCS, a different number of TBs, a different number of RBs per TB, a different retransmission configuration (e.g., disabled, enabled, enabled with one retransmission, enabled with two retransmissions, and/or the like), a different carrier frequency, and/or the like.

In some aspects, the first UE 505-1 may disable retransmission of the V2X transmission, and may select a lowest MCS value (e.g., a lowest MCS index) that satisfies the limit on the number of RBs with retransmission disabled, thereby improving or maximizing the range of the V2X transmission subject to the limit on the number of RBs. As an example, the first UE 505-1 may determine a first set of parameters 525 that includes an MCS index of 1 (e.g., a lower index with a lower data rate and fewer bits per symbol), 9 TBs, a set of RBs per TB shown as $\{X_1, \ldots, X_9\}$, and a retransmission configuration that disables retransmissions. In some aspects, the first UE 505-1 may select the lowest MCS value that does not fall below a default or minimum MCS value to be used by the first UE 505-1.

In some aspects, the first UE 505-1 may enable retransmission of the V2X transmission, and may select a lowest MCS value (e.g., a lowest MCS index) that satisfies the limit on the number of RBs with retransmission enabled, thereby improving or maximizing the range of the V2X transmission subject to the limit on the number of RBs. As an example, the first UE 505-1 may determine a second set of parameters 530 that includes an MCS index of 4 (e.g., a higher index with a higher data rate and more bits per symbol), 3 TBs, a set of RBs per TB shown as $\{Y_1, \ldots, Y_3\}$, and a retransmission configuration that enables retransmissions. In some aspects, the first UE 505-1 may select the lowest MCS value that does not fall below a default or minimum MCS value to be used by the first UE 505-1.

As shown by reference number 535, the first UE 505-1 may select a combination of parameters for the V2X transmission based at least in part on comparing characteristics associated with the multiple combinations. For example, the first UE 505-1 may select a combination of parameters based at least in part on different RB requirements associated with the different combinations, based at least in part on a peak MCS associated with the first UE 505-1, based at least in part on different ranges associated with the different combinations, and/or the like.

In some aspects, the first UE 505-1 may select a combination of parameters based at least in part on different RB requirements associated with the different combinations of parameters. For example, the first UE 505-1 may determine a plurality of resource block requirements corresponding to a plurality of combinations of parameters (e.g., one or more of MCS, number of TBs, number of RBs per TB, and retransmission configuration) for the V2X transmission. The first UE 505-1 may select a combination of parameters based at least in part on comparing the plurality of resource block requirements to the limit on the number of RBs. For example, if a combination of parameters requires a number of RBs that exceeds the limit, then the first UE 505-1 may not select that combination of parameters. Conversely, if a combination of parameters requires a number of RBs that is less than or equal to the limit, then the first UE 505-1 may select that combination of parameters. If multiple combinations of parameters satisfy the resource block limit, then the first UE 505-1 may use one or more other characteristics of the combinations to select a combination. For example, the first UE 505-1 may select a combination that uses the least number of RBs, that has the longest range, that includes an MCS value that is less than a peak MCS value associated with the first UE 505-1, that is most similar to a default combination of parameters associated with the first UE 505-1, and/or the like.

In some aspects, the first UE 505-1 may select a combination of parameters based at least in part on a peak MCS permitted to be used by the first UE 505-1 (e.g., due to hardware limitations of the first UE 505-1, due to a peak MCS defined in a 3GPP standard, and/or the like). For example, if a combination of parameters includes an MCS that exceeds a peak MCS permitted to be used by the first UE 505-1, then the first UE 505-1 may not select that combination of parameters. Conversely, if a combination of parameters includes an MCS that does not exceed a peak MCS permitted to be used by the first UE 505-1, then the first UE 505-1 may select that combination of parameters. If multiple combinations of parameters satisfy the peak MCS constraint, then the first UE 505-1 may use one or more other characteristics of the combinations to select a combination. For example, the first UE 505-1 may select a combination that satisfies the limit on the number of RBs, that uses the least number of RBs, that has the longest range, that is most similar to a default combination of parameters associated with the first UE 505-1, and/or the like.

As an example, the first UE 505-1 may determine a first combination of parameters that satisfies the limit on the number of RBs. However, the first UE 505-1 may determine that a first MCS, included in the first combination of parameters, exceeds a peak MCS permitted to be used by the first UE 505-1. In this case, the first UE 505-1 may determine a second combination of parameters, that includes a second MCS, based at least in part on determining that that the first MCS exceeds the peak MCS. The first UE 505-1 may determine that the second MCS does not exceed the peak MCS, and may transmit the V2X transmission using the second MCS based at least in part on determining that the second MCS does not exceed the peak MCS. In some aspects, the first UE 505-1 may select the first MCS due to a condition that results in a lower limit on the number of RBs (e.g., poor channel conditions, high network traffic conditions, a large amount of data to be transmitted by the first UE 505-1, and/or the like). In this case, the first UE 505-1 may determine the second combination of parameters after waiting a threshold amount of time (e.g., after which the constraint may be less strict, resulting in a higher limit on the number of RBs). Additionally, or alternatively, the first UE 505-1 may determine the second combination of parameters after determining that the condition associated with the limit on the number of RBs has changed (e.g., has relaxed).

In some aspects, the first UE 505-1 may select a combination of parameters to increase or maximize a range for the V2X transmission subject to the limit on the number of RBs. Additionally, or alternatively, the first UE 505-1 may select a combination of parameters that has a longer range as compared to another combination of parameters. For example, the first UE 505-1 may determine a first set of parameters, may determine a second set of parameters, may estimate a first range for the V2X transmission using the first set of parameters, may estimate a second range for the V2X transmission using the second set of parameters, may compare the first range and the second range, and may select the set of parameters associated with the longer range. In some aspects, the first set of parameters may include a first MCS (e.g., with a higher MCS index) that satisfies the limit on the number of RBs with the retransmission configuration configured to enable retransmission of the V2X transmission, and the second set of parameters may include a second MCS (e.g., with a lower MCS index) that satisfies the limit on the number of RBs with the retransmission configuration configured to disable retransmission of the V2X transmission.

In some aspects, the first UE 505-1 may select a combination of parameters based at least in part on one or more default parameters and/or a default combination of parameters (e.g., one or more preferred parameters). For example, the first UE 505-1 may select a combination of parameters based at least in part on a default MCS, a default preference for the number of TBs (e.g., a larger number of TBs or a fewer number of TBs), a default preference for the number of RBs per TB, a default retransmission configuration (e.g., enabled by default, disabled by default, and/or the like), and/or the like. In some aspects, the first UE 505-1 may initially test whether the default combination of parameters satisfies the limit on the number of RBs (e.g., before testing any other combination of parameters). If the default combination of parameters satisfies the limit on the number of RBs, then the first UE 505-1 may use the default combination of parameters for the V2X transmission. If the default combination of parameters does not satisfy the limit on the number of RBs, then the first UE 505-1 may test another combination of parameters (e.g., with a higher MCS index, with retransmissions disabled, with a smaller number of TBs, with a smaller number of RBs per TB, and/or the like). In this way, the first UE 505-1 may conserve UE resources (e.g., processing power, memory, battery power, and/or the like) as compared to always testing multiple combinations of parameters for the V2X transmission.

As shown by reference number 540, the first UE 505-1 may transmit the V2X transmission (e.g., to the second UE 505-2 and/or one or more other UEs 505) using the selected combination of parameters, in a similar manner as described above in connection with FIG. 4. In this way, the first UE 505-1 may improve reliability, may increase safety, may increase the likelihood of successful reception of the V2X transmission, etc., while operating according to the limit on the number of RBs permitted for the V2X transmission.

As indicated above, FIG. 5 is provided merely as an example. Other examples are possible and may differ from what was described with regard to FIG. 5.

Figure 6:
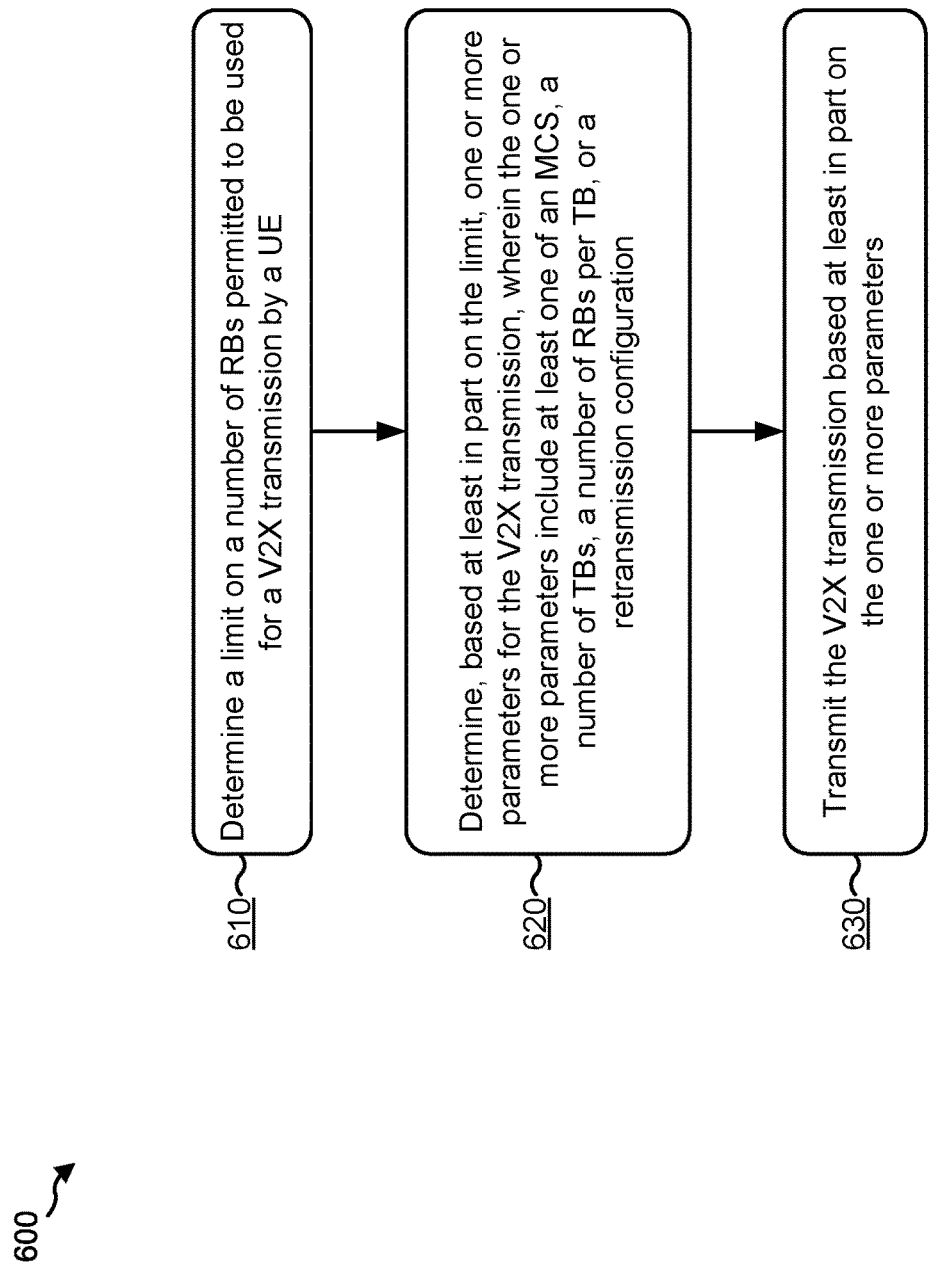
FIG. 6 is a diagram illustrating an example process performed, for example, by a user equipment, in accordance with various aspects of the present disclosure.

FIG. 6 is a diagram illustrating an example process 600 performed, for example, by a UE, in accordance with various aspects of the present disclosure. Example process 600 is an example where a UE (e.g., UE 120, UE 405, UE 505, and/or the like) performs autonomous resource selection for V2X transmissions.

As shown in FIG. 6, in some aspects, process 600 may include determining a limit on a number of resource blocks (RBs) permitted to be used for a vehicle-to-everything (V2X) transmission by the UE (block 610). For example, the UE may determine a limit on a number of RBs permitted to be used for a V2X transmission by the UE, as described above in connection with FIGS. 4 and 5. In some aspects, the limit is determined based at least in part on a congestion level of a sidelink channel via which the V2X transmission is to be transmitted.

As further shown in FIG. 6, in some aspects, process 600 may include determining, based at least in part on the limit, one or more parameters for the V2X transmission, wherein the one or more parameters include at least one of a modulation and coding scheme (MCS) for the V2X transmission, a number of transport blocks (TBs) for the V2X transmission, a number of RBs per TB for the V2X transmission, or a retransmission configuration for the V2X transmission (block 620). For example, the UE may determine one or more parameters for the V2X transmission, as described above in connection with FIGS. 4 and 5. In some aspects, the UE may determine the one or more parameters based at least in part on the limit on the number of RBs. In some aspects, the one or more parameters may include at least one of an MCS for the V2X transmission, a number of TBs for the V2X transmission, a number of RBs per TB for the V2X transmission, or a retransmission configuration for the V2X transmission.

As further shown in FIG. 6, in some aspects, process 600 may include transmitting the V2X transmission based at least in part on the one or more parameters (block 630). For example, the UE may transmit the V2X transmission based at least in part on the one or more parameters, as described above in connection with FIGS. 4 and 5.

Process 600 may include additional aspects, such as any single aspect or any combination of aspects described below.

In some aspects, the one or more parameters are determined for a frequency selected by the UE for the V2X transmission. In some aspects, the one or more parameters are determined based at least in part on one or more dynamic factors associated with the UE or a wireless network via which the V2X transmission is transmitted. In some aspects, the one or more parameters are determined based at least in part on a network traffic demand associated with one or more applications of the UE. In some aspects, the one or more parameters are determined based at least in part on a congestion level associated with a wireless network via which the V2X transmission is to be transmitted. In some aspects, the one or more parameters are determined based at least in part on a carrier frequency on which the V2X transmission is to be transmitted. In some aspects, the one or more parameters are determined based at least in part on a priority of the V2X transmission.

In some aspects, the one or more parameters are determined based at least in part on a velocity of the UE. In some aspects, the one or more parameters are determined based at least in part on a topography of a location associated with the UE. In some aspects, the one or more parameters are determined based at least in part on a location of the UE. In some aspects, the one or more parameters are selected to maximize a range of the V2X transmission subject to the limit on the number of RBs. In some aspects, the one or more parameters are determined based at least in part on at least one of: a number of bits of the V2X transmission, a priority of the V2X transmission, a deadline for transmission of the V2X transmission, a semi-persistent scheduling period associated with the V2X transmission, or some combination thereof. In some aspects, the one or more parameters are determined based at least in part on a default MCS associated with the UE.

In some aspects, the UE may determine a plurality of resource block requirements corresponding to a plurality of combinations of MCS, number of TBs, number of RBs per TB, and retransmission configurations for the V2X transmission; and may determine the one or more parameters based at least in part on comparing the plurality of resource block requirements to the limit on the number of RBs. In some aspects, the UE may determine that a first MCS selected by the UE exceeds a peak MCS permitted to be used by the UE; may determine the one or more parameters, including a second MCS, based at least in part on determining that that the first MCS exceeds the peak MCS; may determine that the second MCS does not exceed the peak MCS; and may transmit the V2X transmission using the second MCS based at least in part on determining that the second MCS does not exceed the peak MCS. In some aspects, the second MCS is determined after waiting a threshold amount of time or determining that a channel condition is satisfied.

In some aspects, the retransmission configuration enables retransmission of the V2X transmission and the UE is configured to select a lowest MCS value that satisfies the limit on the number of RBs with retransmission enabled. In some aspects, the retransmission configuration disables retransmission of the V2X transmission and the UE is configured to select a lowest MCS value that satisfies the limit on the number of RBs with retransmission disabled.

In some aspects, the UE may determine a first set of parameters that includes a first MCS that satisfies the limit on the number of RBs with the retransmission configuration configured to enable retransmission of the V2X transmission; may determine a second set of parameters that includes a second MCS that satisfies the limit on the number of RBs with the retransmission configuration configured to disable retransmission of the V2X transmission; may estimate a first range for the V2X transmission using the first set of parameters; and may estimate a second range for the V2X transmission using the second set of parameters. In some aspects, determining the one or more parameters for the V2X transmission comprises selecting one of the first set of parameters or the second set of parameters based at least in part on comparing the first range and the second range.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    determining a limit on a number of resource blocks (RBs) permitted to be used for a vehicle-to-everything (V2X) transmission by the UE, wherein the limit is determined based at least in part on a congestion level of a sidelink channel via which the V2X transmission is to be transmitted;
    determining, based at least in part on the limit, a combination of parameters for the V2X transmission, wherein the combination of parameters for the V2X transmission includes a modulation and coding scheme (MCS) for the V2X transmission and includes at least one of a number of transport blocks (TBs) for the V2X transmission, a number of RBs per TB for the V2X transmission, or a retransmission configuration for the V2X transmission,
        wherein determining the combination of parameters for the V2X transmission comprises:
            testing an initial combination of parameters for the V2X transmission to determine if the initial combination of parameters for the V2X transmission satisfies the limit on the number of RBs permitted to be used for the V2X transmission by the UE, when the initial combination of parameters for the V2X transmission does not satisfy the limit on the number of RBs permitted to be used for the V2X transmission by the UE, testing a different combination of parameters for the V2X transmission, the different combination of parameters for the V2X transmission having at least one of a different retransmission configuration than the initial combination, a smaller number of TBs than the initial combination, or a smaller number of RBs per TB than the initial combination, and selecting the different combination of parameters for the V2X transmission as the combination of parameters for the V2X transmission when the different combination of parameters for the V2X transmission satisfies the limit on the number of RBs permitted to be used for the V2X transmission by the UE; and transmitting the V2X transmission based at least in part on the combination of parameters for the V2X transmission.

2. The method of claim 1, wherein one or more parameters, included in the combination of parameters for the V2X transmission, are determined based at least in part on one or more dynamic factors associated with the UE or a wireless network via which the V2X transmission is transmitted.

3. The method of claim 1, wherein one or more parameters, included in the combination of parameters for the V2X transmission, are determined based at least in part on a network traffic demand associated with one or more applications of the UE.

4. The method of claim 1, wherein one or more parameters, included in the combination of parameters for the V2X transmission, are determined based at least in part on a congestion level associated with a wireless network via which the V2X transmission is to be transmitted.

5. The method of claim 1, wherein one or more parameters, included in the combination of parameters for the V2X transmission, are determined based at least in part on a carrier frequency on which the V2X transmission is to be transmitted.

6. The method of claim 1, wherein one or more parameters, included in the combination of parameters for the V2X transmission, are determined based at least in part on a priority of the V2X transmission compared to a priority of at least one other V2X transmission.

7. The method of claim 1, wherein one or more parameters, included in the combination of parameters for the V2X transmission, are determined based at least in part on a velocity of the UE.

8. The method of claim 1, wherein one or more parameters, included in the combination of parameters for the V2X transmission, are determined based at least in part on a topography of a location of the UE.

9. The method of claim 1, wherein one or more parameters, included in the combination of parameters for the V2X transmission, are determined based at least in part on a location of the UE.

10. The method of claim 1, wherein one or more parameters, included in the combination of parameters for the V2X transmission, are determined to maximize a range of the V2X transmission subject to the limit on the number of RBs permitted to be used for the V2X transmission by the UE.

11. The method of claim 1, wherein one or more parameters, included in the combination of parameters for the V2X transmission, are determined based at least in part on at least one of:
a number of bits of the V2X transmission,
a deadline for transmission of the V2X transmission,
a semi-persistent scheduling period associated with the V2X transmission, or
some combination thereof.

12. The method of claim 1, wherein one or more parameters, included in the combination of parameters for the V2X transmission, are determined based at least in part on a default MCS associated with the UE or a default combination of parameters for the V2X transmission associated with the UE.

13. The method of claim 1, further comprising:
determining a plurality of resource block requirements corresponding to a plurality of combinations of parameters; and
determining the combination of parameters for the V2X transmission based at least in part on comparing the plurality of resource block requirements to the limit on the number of RBs permitted to be used for the V2X transmission by the UE.

14. The method of claim 13, wherein a resource block requirement, of the plurality of resource block requirements, indicates a number of resource blocks required to transmit the V2X transmission using a particular combination of an MCS, a number of TBs, a number of RBs, and a retransmission configuration.

15. The method of claim 1, wherein determining the combination of parameters for the V2X transmission comprises:
determining that a first MCS, selected by the UE, exceeds a peak MCS permitted to be used by the UE;
determining a second MCS based at least in part on determining that the first MCS exceeds the peak MCS;
determining that the second MCS does not exceed the peak MCS; and
wherein transmitting the V2X transmission comprises transmitting the V2X transmission using the second MCS based at least in part on determining that the second MCS does not exceed the peak MCS.

16. The method of claim 15, wherein the second MCS is determined after waiting a threshold amount of time or determining that a condition associated with the limit on the number of RBs permitted to be used for the V2X transmission by the UE has changed.

17. The method of claim 1, wherein the combination of parameters for the V2X transmission include the retransmission configuration, wherein the retransmission configuration enables retransmission of the V2X transmission; and
wherein determining the combination of parameters for the V2X transmission comprises selecting the lowest MCS value that satisfies the limit on the number of RBs permitted to be used for the V2X transmission by the UE with retransmission enabled.

18. The method of claim 1, wherein the combination of parameters for the V2X transmission include the retransmission configuration, wherein the retransmission configuration disables retransmission of the V2X transmission; and
wherein determining the combination of parameters for the V2X transmission comprises selecting the lowest MCS value that satisfies the limit on the number of RBs permitted to be used for the V2X transmission by the UE with retransmission disabled.

19. The method of claim 1, wherein the combination of parameters for the V2X transmission include the retransmission configuration; and
wherein the method further comprises:
determining a first set of parameters that includes a first MCS that satisfies the limit on the number of RBs permitted to be used for the V2X transmission by the UE with the retransmission configuration configured to enable retransmission of the V2X transmission;
determining a second set of parameters that includes a second MCS that satisfies the limit on the number of RBs permitted to be used for the V2X transmission by the UE with the retransmission configuration configured to disable retransmission of the V2X transmission;
estimating a first range for the V2X transmission using the first set of parameters;
estimating a second range for the V2X transmission using the second set of parameters; and
wherein determining the combination of parameters for the V2X transmission comprises selecting one of the first set of parameters or the second set of parameters based at least in part on comparing the first range and the second range.

20. A user equipment (UE) for wireless communication, comprising:
memory; and
one or more processors operatively coupled to the memory, the memory and the one or more processors configured to:
determine a limit on a number of resource blocks (RBs) permitted to be used for a vehicle-to-everything (V2X) transmission by the UE, wherein the limit is determined based at least in part on a congestion level of a sidelink channel via which the V2X transmission is to be transmitted;
determine, based at least in part on the limit, a combination of parameters for the V2X transmission, wherein the combination of parameters for the V2X transmission include a modulation and coding scheme (MCS) for the V2X transmission and includes at least one of a number of transport blocks (TB s) for the V2X transmission, a number of RBs per TB for the V2X transmission, or a retransmission configuration for the V2X transmission,
wherein the one or more processors, when determining the combination of parameters for the V2X transmission, are to:
test an initial combination of parameters for the V2X transmission to determine if the initial combination of parameters for the V2X transmission satisfies the limit on the number of RBs permitted to be used for the V2X transmission by the UE, and
when the initial combination of parameters for the V2X transmission does not satisfy the limit on the number of RBs permitted to be used for the V2X transmission by the UE, test a different combination of parameters for the V2X transmission,
the different combination of parameters for the V2X transmission having at least one of a different retransmission configuration than the initial combination, a smaller number of TBs than the initial combination, or a smaller number of RBs per TB than the initial combination, and select the different combination of parameters for the V2X transmission as the combination of parameters for the V2X transmission when the different combination of parameters for the V2X transmission satisfies the limit on the number of RBs permitted to be used for the V2X transmission by the UE; and
transmit the V2X transmission based at least in part on the combination of parameters for the V2X transmission.

21. The UE of claim 20, wherein one or more parameters, included in the combination of parameters for the V2X transmission, are determined based at least in part on one or more of:
a dynamic factor associated with the UE or a wireless network via which the V2X transmission is transmitted,
a network traffic demand associated with one or more applications of the UE,
the congestion level of the sidelink channel,
a carrier frequency on which the V2X transmission is to be transmitted,
a priority of the V2X transmission compared to a priority of at least one other V2X transmission,
a velocity of the UE,
a topography of a location of the UE,
a location of the UE,
a number of bits of the V2X transmission,
a priority of the V2X transmission,
a deadline for transmission of the V2X transmission,
a semi-persistent scheduling period associated with the V2X transmission,
a default MCS associated with the UE or a default combination of parameters for the V2X transmission associated with the UE, or
some combination thereof.

22. The UE of claim 20, wherein one or more parameters, included in the combination of parameters for the V2X transmission, are determined to maximize a range of the V2X transmission subject to the limit on the number of RBs permitted to be used for the V2X transmission by the UE.

23. The UE of claim 20, wherein the memory and the one or more processors are further configured to:
determine a plurality of resource block requirements corresponding to a plurality of combinations of parameters; and
determine the combination of parameters for the V2X transmission based at least in part on comparing the plurality of resource block requirements to the limit on the number of RBs permitted to be used for the V2X transmission by the UE.

24. The UE of claim 20, wherein the memory and the one or more processors, when determining the combination of parameters for the V2X transmission, are configured to:
determine that a first MCS, selected by the UE, exceeds a peak MCS permitted to be used by the UE;
determine a second MCS based at least in part on determining that that the first MCS exceeds the peak MCS;
determine that the second MCS does not exceed the peak MCS; and
wherein the memory and the one or more processors, when transmitting the V2X transmission, are configured to transmit the V2X transmission using the second MCS based at least in part on determining that the second MCS does not exceed the peak MCS.

25. The UE of claim 24, wherein the second MCS is determined after waiting a threshold amount of time or determining that a condition associated with the limit on the number of RBs permitted to be used for the V2X transmission by the UE has changed.

26. The UE of claim 20, wherein the combination of parameters for the V2X transmission include the retransmission configuration, wherein the retransmission configuration enables retransmission of the V2X transmission; and
  wherein the memory and the one or more processors, when determining the combination of parameters for the V2X transmission, are configured to select the lowest MCS value that satisfies the limit on the number of RBs permitted to be used for the V2X transmission by the UE with retransmission enabled.

27. The UE of claim 20, wherein the combination of parameters for the V2X transmission include the retransmission configuration, wherein the retransmission configuration disables retransmission of the V2X transmission; and
  wherein the memory and the one or more processors, when determining the combination of parameters for the V2X transmission, are configured to select the lowest MCS value that satisfies the limit on the number of RBs permitted to be used for the V2X transmission by the UE with retransmission disabled.

28. The UE of claim 20, wherein the combination of parameters for the V2X transmission include the retransmission configuration; and
  wherein the memory and the one or more processors are further configured to:
    determine a first set of parameters that includes a first MCS that satisfies the limit on the number of RBs permitted to be used for the V2X transmission by the UE with the retransmission configuration configured to enable retransmission of the V2X transmission;
    determine a second set of parameters that includes a second MCS that satisfies the limit on the number of RBs permitted to be used for the V2X transmission by the UE with the retransmission configuration configured to disable retransmission of the V2X transmission;
    estimate a first range for the V2X transmission using the first set of parameters;
    estimate a second range for the V2X transmission using the second set of parameters; and
  wherein the memory and the one or more processors, when determining the combination of parameters for the V2X transmission, are configured to select one of the first set of parameters or the second set of parameters based at least in part on comparing the first range and the second range.

29. An apparatus for wireless communication, comprising:
  means for determining a limit on a number of resource blocks (RBs) permitted to be used for a vehicle-to-everything (V2X) transmission by the apparatus, wherein the limit is determined based at least in part on a congestion level of a sidelink channel via which the V2X transmission is to be transmitted;
  means for determining, based at least in part on the limit, a combination of parameters for the V2X transmission, wherein the combination of parameters for the V2X transmission includes a modulation and coding scheme (MCS) for the V2X transmission and includes at least one of a number of transport blocks (TBs) for the V2X transmission, a number of RBs per TB for the V2X transmission, or a retransmission configuration for the V2X transmission,
  wherein the means for determining the combination of parameters for the V2X transmission includes:
    means for testing an initial combination of parameters for the V2X transmission to determine if the initial combination of parameters for the V2X transmission satisfies the limit on the number of RBs permitted to be used for the V2X transmission by the apparatus,
    when the initial combination of parameters for the V2X transmission does not satisfy the limit on the number of RBs permitted to be used for the V2X transmission by the UE, means for testing a different combination of parameters for the V2X transmission,
      the different combination of parameters for the V2X transmission having at least one of a different retransmission configuration than the initial combination, a smaller number of TBs than the initial combination, or a smaller number of RBs per TB than the initial combination, and
    means for selecting the different combination of parameters for the V2X transmission as the combination of parameters for the V2X transmission when the different combination of parameters for the V2X transmission satisfies the limit on the number of RBs permitted to be used for the V2X transmission by the apparatus; and
  means for transmitting the V2X transmission based at least in part on the combination of parameters for the V2X transmission.

30. A non-transitory computer-readable medium storing instructions for wireless communication, the instructions comprising:
  one or more instructions that, when executed by one or more processors of a user equipment (UE), cause the one or more processors to:
    determine a limit on a number of resource blocks (RBs) permitted to be used for a vehicle-to-everything (V2X) transmission by the UE, wherein the limit is determined based at least in part on a congestion level of a sidelink channel via which the V2X transmission is to be transmitted;
    determine, based at least in part on the limit, a combination of parameters for the V2X transmission, wherein the combination of parameters for the V2X transmission includes a modulation and coding scheme (MCS) for the V2X transmission and includes at least one of a number of transport blocks (TBs) for the V2X transmission, a number of RBs per TB for the V2X transmission, or a retransmission configuration for the V2X transmission,
    wherein the one or more instructions, that cause the one or more processors to determine the combination of parameters for the V2X transmission, cause the one or more processors to:
      test an initial combination of parameters for the V2X transmission to determine if the initial combination of parameters for the V2X transmission satisfies the limit on the number of RBs permitted to be used for the V2X transmission by the UE,
      when the initial combination of parameters for the V2X transmission does not satisfy the limit on the number of RBs permitted to be used for the V2X transmission by the UE, test a different combination of parameters for the V2X transmission, the different combination of parameters for the V2X transmission having at least one of a different retransmission configuration than the initial combination, a smaller number of TBs than the initial combination, or a smaller number of RBs per TB than the initial combination, and select the different combination of parameters for the V2X transmission as the combination of parameters for the V2X transmission when the different combination of parameters for the V2X transmission satisfies the limit on the number of RBs permitted to be used for the V2X transmission by the UE; and transmit the V2X transmission based at least in part on the combination of parameters for the V2X transmission.

* * * * *